United States Patent [19]

Giberson

[11] Patent Number: 5,315,825

[45] Date of Patent: May 31, 1994

[54] OIL SYSTEM FOR CONSTANT INPUT SPEED FLUID DRIVE

[76] Inventor: Melbourne F. Giberson, 5 Spring Mill La., Haverford, Pa. 19041

[21] Appl. No.: 998,959

[22] Filed: Dec. 31, 1992

[51] Int. Cl.[5] ............................................. F16D 31/02
[52] U.S. Cl. ...................................... 60/336; 60/357; 60/456
[58] Field of Search ................ 60/405, 396, 456, 453, 60/454, 357, 334, 348, 352, 336, 337, 338, 339, 329

[56] References Cited

U.S. PATENT DOCUMENTS

| | | | |
|---|---|---|---|
| 3,063,245 | 11/1962 | Rippy | 60/337 |
| 3,090,195 | 5/1963 | Fisher et al. | 60/337 |
| 3,146,595 | 9/1964 | Deitrickson | 60/348 |
| 3,222,866 | 12/1965 | Lehmann | 60/336 |
| 3,320,748 | 5/1967 | Nelden | 60/337 |
| 3,347,042 | 10/1967 | Horsch | 60/337 |
| 3,435,612 | 4/1969 | Hensler | 60/336 |
| 3,774,735 | 11/1973 | Hanke et al. | 60/337 X |
| 4,062,187 | 12/1977 | Hilpert | 60/336 X |

OTHER PUBLICATIONS

Installation And Operating Instructions For Voith Variable Speed Geared Turbo Coupling; Voith GmbH & Co Post Fach 460, Oct., 1981.
Semiconductor Piping Diagram 212 "VS" C2-7 Gypol Fl. Drive; American Blower Corp. Detroit, Michigan Jun. 6, 1959.

*Primary Examiner*—Edward K. Look
*Assistant Examiner*—Hoang Nguyen
*Attorney, Agent, or Firm*—Polster, Lieder, Woodruff & Lucchesi

[57] ABSTRACT

In a system for supplying oil to a fluid drive, the fluid drive having an impeller, and a runner fluidically coupled by oil between them, the degree of coupling being determined by the amount of oil between them, a temperature sensor is located to sense the temperature of oil as it is being discharged from the impeller-runner, and the temperature so sensed is translated into the opening and restricting of a control valve controlling the flow of oil to the fluid drive to maintain the discharged oil temperature substantially constant. An external reservoir is connected to the sump of the fluid drive by pipe of sufficient size to provide a head space above the oil being removed from the sump, and the reservoir itself is of such a size as to provide head space and to provide a dwell time long enough to permit detrainment from the oil of air entrained in the oil as it passes through the fluid drive system. AC motor driven pumps are provided connected to supply circuit oil to the fluid drive and lubricating oil to the bearings, and a stand-by DC motor driven pump is provided, energized in response to an abnormal condition such as loss of AC power, overheating of the circuit oil or drastic loss of pressure in the lubricating oil system, to supply lubrication oil directly to the bearings and cooling oil to the fluid drive.

19 Claims, 5 Drawing Sheets

OIL SYSTEM FOR CONSTANT INPUT SPEED FLUID DRIVE

BACKGROUND OF THE INVENTION

This invention has to do with a system of supplying oil to a device to which oil is supplied continuously and which generates substantial heat in varying quantities in the course of utilizing the oil, such as a fluid drive between a steam turbine-generator shaft and a boiler water feed water pump. In this application, the oil is utilized to transfer power in the fluid drive element, to remove the heat generated and also to lubricate the bearings of the fluid drive, the gearbox, if used, and the boiler feed water pump, and to lubricate the flexible gear type couplings, if used.

In a large electric power plant, in which a boiler with the usual tubes supplies steam to a turbine for generating electricity, the boiler feed water pump is a critical element. The flow rate of water to the boiler must be controlled with considerable nicety to match the steam flow requirement of the turbine which varies according to the amount of electrical power being generated at any given moment.

It is customary in many electrical generating plants to use an extension shaft of the main turbine-generator shaft to power the boiler feed pump. That turbine-generator shaft rotates at a constant speed, generally at 3600 revolutions per minute. In order to vary the speed of the feed water pump, hence to vary the water flow to the boiler, a fluid drive is provided between the extension shaft and the boiler feed water pump shaft.

Such a fluid drive consists essentially of an impeller and a runner, both enclosed in a rotating casing, and the whole enclosed in an outer, stationary housing. The impeller and casing are assembled and mounted on the input shaft of the fluid drive, which is coupled to, and driven by, the extension shaft and they rotate at the constant speed of the turbine-generator. The runner is mounted on the output shaft, which drives the boiler feed water pump through a flexible coupling, and if used, a gearbox. The flexible couplings on the input and output ends of the fluid drive may be of any of several designs, depending upon the requirements of the mating shafts, and need not be the same for input and output.

The variable speed capability of a fluid drive is provided by the runner being physically unconnected to the impeller or casing, and by oil within the casing being thrown by the impeller vanes against the vanes of the runner, causing the runner to rotate. The impeller and runner are generally of similar design in that they are made in the form of vanes and pockets interspersed uniformly around 360 degrees, although the numbers of vanes and pockets differ between the impeller and runner. "Circuit" oil is continuously introduced into the impeller/runner/casing and leaves the casing via a scoop tube. The rotation of the impeller and casing causes the oil to move outward, under centrifugal force, to form a vortex or ring, retained on its radially outer side by the inner surface of the casing. The inner radius of the ring of oil is determined by the radial position of the scoop tube within the casing. When the casing is full, that is, when the scoop tube is moved to its radially innermost limit, the slippage between the impeller and runner is low, so that the runner rotates at substantially the same speed as the impeller. In order to reduce the driving forces of the impeller on the runner, the radial thickness of the oil ring is reduced by moving the scoop tube radially outwardly toward the casing. Clearly, if all of the oil were removed, and no oil were being introduced, the runner would remain stationary.

It can be appreciated that the thinner the ring of oil radially, the less efficient is the transmission of energy from the impeller to the oil to the runner, with the energy not transmitted to the runner taking the form of heat generated in the oil within the impeller/runner/casing.

Table 1 below provides a typical representation of the power in, power out, and heat generated (power loss) for a boiler feed water pump of approximately 14,500 hp rated power, wherein the power requirements for the pump are proportional to the cube of the speed, for example. The peak heat generation point occurs when the output speed is approximately ⅔ of the input speed, or at approximately 2400 rpm, for an input speed of 3600 rpm. Depending upon boiler water pressure and flow rates, the fluid drive output speed may be either above, at, or below the speed corresponding to this peak heat generation point.

Also noted in this table are typical power losses related to the bearings and to passing the oil into the impeller and out through the scoop tube. In this process, the oil speeds up from zero to input shaft speed as it enters the impeller, and then is driven into the scoop tube as it exits the casing.

The data of Table 1 are common to the data of Tables 2 and 3, infra. In all three tables, the speed of rotation of the impeller is a constant 3600 rpm.

TABLE 1

| | RPM OUT | HP IN ROTATING ELEMENT | HP OUT ROTATING ELEMENT | HP LOSS ROTATING ELEMENT | HP LOSS BEARINGS |
| --- | --- | --- | --- | --- | --- |
| 1. | 3510 | 15,000 | 14,625 | 375 | 200 |
| 2. | 3300 | 13,259 | 12,154 | 1,105 | 195 |
| 3. | 3100 | 11,700 | 10,075 | 1,625 | 190 |
| 4. | 2900 | 10,238 | 8,248 | 1,990 | 185 |
| 5. | 2700 | 8,874 | 6,656 | 2,218 | 180 |
| 6. | 2500 | 7,609 | 5,284 | 2,325 | 175 |
| 7. | 2400 | 7,013 | 4,675 | 2,338 | 173 |
| 8. | 2300 | 6,441 | 4,115 | 2,326 | 170 |
| 9. | 2100 | 5,369 | 3,132 | 2,237 | 165 |
| 10. | 1900 | 4,396 | 2,320 | 2,076 | 160 |
| 11. | 1700 | 3,519 | 1,662 | 1,857 | 155 |
| 12. | 1500 | 2,738 | 1,141 | 1,597 | 150 |
| 13. | 1400 | 2,386 | 928 | 1,458 | 145 |
| 14. | 800 | 779 | 173 | 606 | 100 |

There is a continual flow of circuit oil through the fluid drive element (impeller/runner/casing), into the impeller/runner portion, out through the gap between the impeller and runner outer peripheries, into the casing portion and exiting through the scoop tube and through the gap between the impeller and runner outer peripheries, into the casing portion and exiting through the scoop tube and through weep holes in the casing. This circuit oil is discharged through the scoop tube at a velocity of several hundred feet per second, entrains air, and settles as foam in the sump at the bottom of the fluid drive tank.

The lube oil from the bearings in the fluid drive, from the gearbox, if used, and from the bearings of the boiler feed water pump, and from the couplings, if any, also drain into the same sump at the bottom of the fluid drive tank. All of the draining lube oil and discharge circuit oil mixes together in this sump. Clearly, the oil that is used to operate the fluid drive element, i.e., the circuit oil, and the lubricating oil are the same, with the flow paths being separated only in the piping supplying the circuit oil to the impeller/runner/casing element and piping supplying the lube oil to the bearings, gearbox, and couplings.

It is known that the output shaft speed is controlled primarily by the scoop tube position and to some degree by the circuit oil flow rate. In some earlier fluid drives, the speed control was performed entirely by a flow control valve with a series of leakoff orifices in the casing but without a scoop tube.

In conventional arrangements, shown in FIGS. 1, 2, and 3, the lower portion, or sump, of the fluid drive tank is used as an oil reservoir, holding oil in a quantity which provides only about one minute dwell time before entering the pipes leading to the suction of the pumps. This is not enough time to detrain the air from the oil.

Because the sump/reservoir is relatively small, it is very easy to change the level, or as seen by a sight glass, the apparent level, of the oil in the sump/reservoir. The three primary causes of change of oil level are these: (1) The foaming action due to the entrained air; (2) The temperature distribution of the oil throughout the system because oil expands with increasing temperature; and (3) The amount of oil resident in the oil ring in the impeller/runner/casing assembly. Together, all of these influences provide uncertainty as to the precise level of oil in the sump/reservoir, and cause operators to add or remove oil on a daily basis, sometimes on a shift to shift basis.

The cumulative result is that over the years there have been many instances of over filling of fluid drives. This is the single most damaging occurrence, short of a severe mechanical failure such as a broken shaft, that can occur to a fluid drive. When the fluid drive is over filled, the oil enters the open end of the casing through which the scoop tube passes, usually damaging the scoop tube so that it can not accommodate the oil discharge flow, so that oil flow through the impeller/runner/casing is reduced and the power dissipated increases, with the result of very high oil temperatures, on the order of 300° to 400° F. When this occurs, the entire fluid drive and oil system must be dismantled, the coked oil removed, damaged parts replaced, and the entire system rebuilt.

Three arrangements of positive displacement pumps have been commonly used:

Arrangement (1), illustrated in FIG. 1, and designated by the reference numeral 101: Uses one internal oil pump 130 within the reservoir which is driven by gearing from the input shaft, one external A.C. powered oil pump 40, and no D.C. powered oil pump.

Arrangement (2), illustrated in FIG. 2, and designated by the reference numeral 201: Uses three external pumps, two main A.C. powered oil pumps 40 supplying both circuit oil and lube oil, with one emergency D.C. powered lube oil pump 41.

Arrangement (3), illustrated in FIG. 3, and designated by the reference numeral 301: Uses two or, for higher flow requirements, three main A.C. powered circuit oil pumps 40, two main A.C. powered lube oil pumps 140, and one emergency D.C. powered lube oil pump 41.

The oil passes from the pumps through heat exchangers 50, in this case called oil coolers, to remove the heat generated within the element, in the bearings, etc. Control valves are usually used to control the cooling water flow in order to keep the temperature of the oil leaving the coolers as close to the desired set point as possible. The temperature desired in the conventional systems for the fluid drive oil as it exits the cooler is usually on the order of 130° F. For the improved system of this invention, the desired temperature for the fluid drive oil as it exits the cooler is about 110° F., and coolers with a capacity to provide this 110° F. cooler discharge oil temperature are provided. The 110° F. cooler discharge temperature for fluid drive oil then approximates the cooler discharge temperature for the oil for most conventional turbine-generators, thereby eliminating a source of confusion for the power plant operators.

With regard to the circuit cooling oil line feature, many but not all of the conventional oil systems have one.

In present conventional fluid drive oil systems, only the lube oil passes through filters 163, usually two or three parallel filters, so one or two can be valved into service with the other one cut out of service for maintenance.

The lube oil flow rate through the system is constant.

The circuit oil flow rate through the fluid drive element is constant when in service. Arrangements (1) and (2) use a "Trip" valve (shown as TV-2 in FIGS. 1 and 2) that causes the oil flow through the circuit oil piping to go either to the element when the fluid drive is in service or to return to the sump/reservoir in the bottom of the fluid drive tank when the fluid drive is out of service. A "Trip valve" is one that is open or closed, and travels rapidly from one state to the other. In Arrangement (3), FIG. 3, the circuit oil pumps are turned on when the fluid drive is in service, and they are turned off when the fluid drive is out of service.

As shown in Table 1, the heat generated (power loss) in the oil within the element is, in large measure, a function of the relative speeds of the input and output shafts. With a constant flow of circuit oil, the temperature of the circuit oil as it discharges from the element is a similar function of the relative speeds of the input and output shafts, Table 2.

It is highly desirable for the type of oil used in fluid drives, turbines, and similar pieces of rotating machinery not to exceed approximately 185° F., as exceeding this temperature will cause the oil to degenerate, and to form a varnish-like substance which coats all of the oil wetted surfaces. In time, this requires that the oil be replaced, at a minimum. Disassembly and removal of the varnish-like coating often is required, with subsequent reassembly.

In the original design of most of these fluid drives, the intent was to pass quickly through the lower speeds during start-up and to operate entirely in the more efficient range with the output shaft speed above 2700 rpm, usually approaching maximum electrical generation. Consequently, the heat exchangers were designed accordingly; and not for the maximum heat generation point shown in the above example. However, in recent years, it has become necessary to operate many of these electrical generating plants over a very wide range of conditions, including those associated with reduced output shaft speeds causing the operating temperatures to become excessive under some conditions. To reduce the circuit oil discharge temperature, several design changes have been made, including increasing pump size providing greater flow capacity, and adjusting the setting of the pressure relief valve for each pump that pumps oil to the fluid drive circuit. The pressure relief valve is a bypass valve positioned between the output or high pressure side of the pump, and the suction line leading to the inlet or low pressure side of the pump. Operators commonly change the setting of this valve to get more or less flow to the fluid drive. This valve is not intended to have continuous flow, but is intended only for intermittent use to protect the motor and pump in response to abnormally high discharge pressure such as would occur in the event that a downstream blockage happened Nevertheless, in conventional systems, these pressure relief valves often experience continuous flow. Among other things, this decreases the mean time between failures.

The position of the scoop tube is regulated by a controller responsive to the steam flow, steam drum level, and feed water flow, and operates on an instantaneous basis as follows: When a change of feed water flow is desired by the boiler controls, it sends a signal to the scoop tube positioner, which moves the scoop tube, which changes the inside radius of the oil ring, which changes the output shaft speed. This method provides a very quick and powerful change of speed. The problem that occurs with higher circuit oil flow is that it becomes more difficult to control the output shaft speed, hence feed water flow, at lower feed water flow rates, and for this reason lower circuit oil flow is desirable. Consequently, determining the desired constant flow rate for the circuit oil can become a serious point of contention, particularly in times of hot cooling water due to hot ambient conditions, such as on a hot summer day.

There is another reason to minimize the circuit oil flow through the impeller/runner/casing/scoop tube. As indicated in Tables 2 and 3, several hundred horsepower are required to drive the oil into the impeller and out through the scoop tube. This power loss is proportional to the radial position of the scoop tube and is directly proportional to the circuit oil flow rate. With operating conditions that cause reduced heat loss, the circuit oil flow can be reduced, providing improved overall operating efficiency of the fluid drive, as indicated by the column HP SAVED in Table 3. This represents fuel that does not have to be burned to provide the same net electrical generation to customers, and therefore is an environmental improvement.

The circuit oil discharge temperature is measured by thermo-couples or similar devices located in a collection tray mounted to the inside wall of the fluid drive tank, so that these thermocouples can provide information to controllers, recording devices and/or monitors remote from the fluid drive. If an excessive temperature is detected, as would occur in the case of "freezing" of the boiler feedpump due to galling between the rotating pump element and the stationary components as would occur if the boiler feed water supply were interrupted, overfilling a fluid drive, or loss of cooling water to the oil heat exchangers, etc., then the fluid drive, circuit oil pumps, and turbine-generator are shut down automatically.

When the fluid drive is shut down for any reason, normal or abnormal, it still requires lube oil and should have circuit cooling oil. This is particularly true for a fluid drive that is attached to a turbine-generator, as these often require 35 to 45 minutes for the rotational speed to drop from 3600 rpm to zero.

The following describes the operational characteristics of the three aforementioned conventional oil systems during the shut-down period, both with and without the availability of A.C. power.

Arrangement No. 1

During the shut-down period, with or without A.C. power available, trip valve TV-2 goes to the by-pass position, so that the circuit oil returns directly to the sump, without any additional restriction, because there is no trip valve TV-1, as shown in Arrangements 2 and 3, to limit the flow of circuit oil, which, if it existed, would save this oil for the lubrication of the bearings.

The oil flow through the internal oil pump 130 is proportional to its rotational speed which drops as a direct ratio of the reduction of speed of the turbine-generator shaft as it slows down from 3600 rpm to the turning gear speed of approximately 3 rpm. As the pump speed drops, so does the discharge pressure, and at some preset point, a low pressure switch 132 closes. If A.C. power is available, the A.C. pump starts to pump oil, maintaining the desired oil flow and pressure. In Arrangement 1, this A.C powered pump is "full size", that is, it has approximately the same capacity as the internal gear driven oil pump.

Without A.C. power, the internal oil pump is the oil pump available. As the pump speed drops to a very low level, oil at a very low flow is pumped. Because there is no trip valve TV-1, the oil that is pumped can escape into the sump without being forced into the bearings. This is, therefore, a marginal oil system.

Arrangement No. 2

During the shut-down period, with or without A.C. power available, trip valve TV-2 goes to the by-pass position, so that the circuit oil returns directly to the sump.

With A.C. power available, trip valve TV-1 remains open, and the A.C. powered pump(s) remain in service.

During a shut-down period, without A.C. power available, trip valve TV-1, shuts off the flow of circuit oil, so that all oil pumped by the D.C. powered pump goes to lubricate the bearings. None goes directly to the sump, and none goes to the circuit cooling oil line, even if that line exists. This may cause some temporary overheating of the circuit element, but will prevent damage to the bearings.

Arrangement No. 3

In this Arrangement, the function of trip valve TV-2 of Arrangement 2 is substantially replaced by a separate circuit oil system.

During a shut-down period with A.C. power available, the A.C. powered lube oil pumps remain in service, and the A.C. powered circuit oil pumps shut down. If trip valve TV-1 exists in the circuit cooling oil line, it remains open.

During a shut-down period without A.C. power available, all of the A.C. powered pumps shut down, and the D.C. powered lube oil pump starts. For those systems that have a circuit cooling oil line with trip valve TV-1 in it, TV-1 closes so that all oil pumped by the D.C. powered pump goes to lubricate the bearings. Again, this may cause temporary overheating of the circuit element, but it will prevent damage to the bearings.

In the conventional oil systems of Arrangements 2 and 3, shown in FIGS. 2 and 3, respectively, usually one of the conditions that will start the D.C. pump is low pressure in the bearing lube oil line. While loss of A.C. power will cause low bearing oil pressure, so will a broken pipe, or open filter canister, or open heat exchanger. Note, however, in the conventional systems of Arrangements 2 and 3, that the only condition for which full protection is provided by the use of the D.C. powered pump is loss of A.C. power. Again, in Arrangement 1, there is no D.C. pump to provide lube oil with loss of A.C. power, making Arrangement 1 a very marginal system.

It is for this reason that in the improved oil systems of Arrangements 2A and 3A, shown in FIGS. 2A and 3A, respectively, the D.C. pump discharge line bypasses the A.C. pumps, heat exchangers, filters, and the related valving, so as to be able to supply lube oil to the bearings and circuit cooling oil under a large number of potential problem conditions and locations that are not covered in the respective conventional systems. The D.C. pumps is sized so as to handle both the lube oil requirements and the circuit cooling oil requirements.

It should be added that the controls should be set up so that if the D.C. pump is started by sensing low bearing oil pressure, this alone will also shut down the entire turbine-generator.

While the improved Arrangement, which might be called 1A, that corresponds to Arrangement 1, is not shown in a specific figure, many of the improvements shown for Arrangements 2 and 3 can be applied to Arrangement 1. About the only one that can not be easily applied is the use of the external tank while retaining the internal oil pump.

Some variations of the conventional Arrangements use a pressure control valve to maintain a substantially constant lube oil pressure to the bearings of the boiler feed pump and to other auxiliary equipment such as couplings or a gear box, if used. The use of this pressure control valve is compatible with any of required.

SUMMARY OF THE INVENTION

In accordance with this invention, generally stated, a system is provided for supplying oil to a device such as a fluid drive of a steam turbine for driving a boiler feed water pump, fan or the like, wherein an input shaft is connected to an impeller of the fluid drive and an output shaft is connected to a runner, and the impeller and runner are fluidically coupled by oil between them, the degree of coupling being determined by the amount of oil between them, pump means are provided for supplying oil to the fluid drive and means for removing oil therefrom, a device is provided and positioned to sense the temperature of the oil being discharged from the fluid drive and for generating a signal in response to the sensed temperature, and a control valve located in a line between the pump and the fluid drive, responsive to the signal, controls the flow of circuit oil to the fluid drive element. The signal can be in the form of an electric impulse, air or a hydraulic force. The important aspect is the opening of the valve to supply additional circuit oil when the temperature in the circuit oil collection tray exceeds a certain established point, and to decrease the circuit oil flow by throttling the valve in response to a temperature below that established point.

Also in the preferred embodiment, the reservoir is a separate reservoir of high capacity compared with the built-in sump of the fluid drive housing, connected to the fluid drive sump by a pipe of sufficiently large diameter to remain unfilled by the oil discharged by the fluid drive. In this way, the fluid drive sump is converted from a wet sump to a dry sump, dry in the sense that it is not used as a reservoir. The provision of head space within the drain pipe to the external reservoir permits the entrained air to be at least partly detrained in the passage from the sump to the external reservoir. The external reservoir is of large capacity, with substantial head space, permitting both detrainment of air from the oil and a dwell time at least twice as long as the dwell time in the wet sump reservoir of the fluid drive housing. A pan, or series of pans, may be included in the external reservoir over which the oil can flow to provide additional detraining, if desired or required. Because the oil in the external reservoir has been largely de-aerated, its level in the reservoir can easily be determined. Furthermore, the removal of the oil from the fluid drive sump obviates the problem of over filling that sump, hence over filling of the fluid drive. It can be seen that in the preferred system, the oil to the fluid drive element (impeller/runner/casing) as well as the oil to the bearings is both cooled and filtered. Filtering the circuit oil is advantageous because it reduces the amount of sediment centrifuged out of the oil and plated on the inside of the rotating casings. Because this plating is not uniform, the element becomes unbalanced, which leads to increased vibration, and often, to bearing damage.

Also in the preferred embodiment shown in FIG. 2, the outlet pipe from the reservoir leads to the intake side of each pump. The pipe from the outlet of each pump goes to the inlet of the heat exchangers which discharge the oil at a set point of 110° F., and from the heat exchangers to the filters. The pipe immediately downstream of the filters is called the "header" as several pipes branch from it. The principal lines are (1) circuit oil supply line which connects to a temperature control valve thence to the fluid drive, (2) lube oil line which communicates to all bearings, and to the gearbox, if used, and (3) a bypass line which permits all excess oil to return to the reservoir. A pressure responsive valve is located in this return (bypass) line to the reservoir, with the valve opening to be such as to maintain a constant pressure in the header regardless of how much oil flows through each branch from the header.

Figure 1:
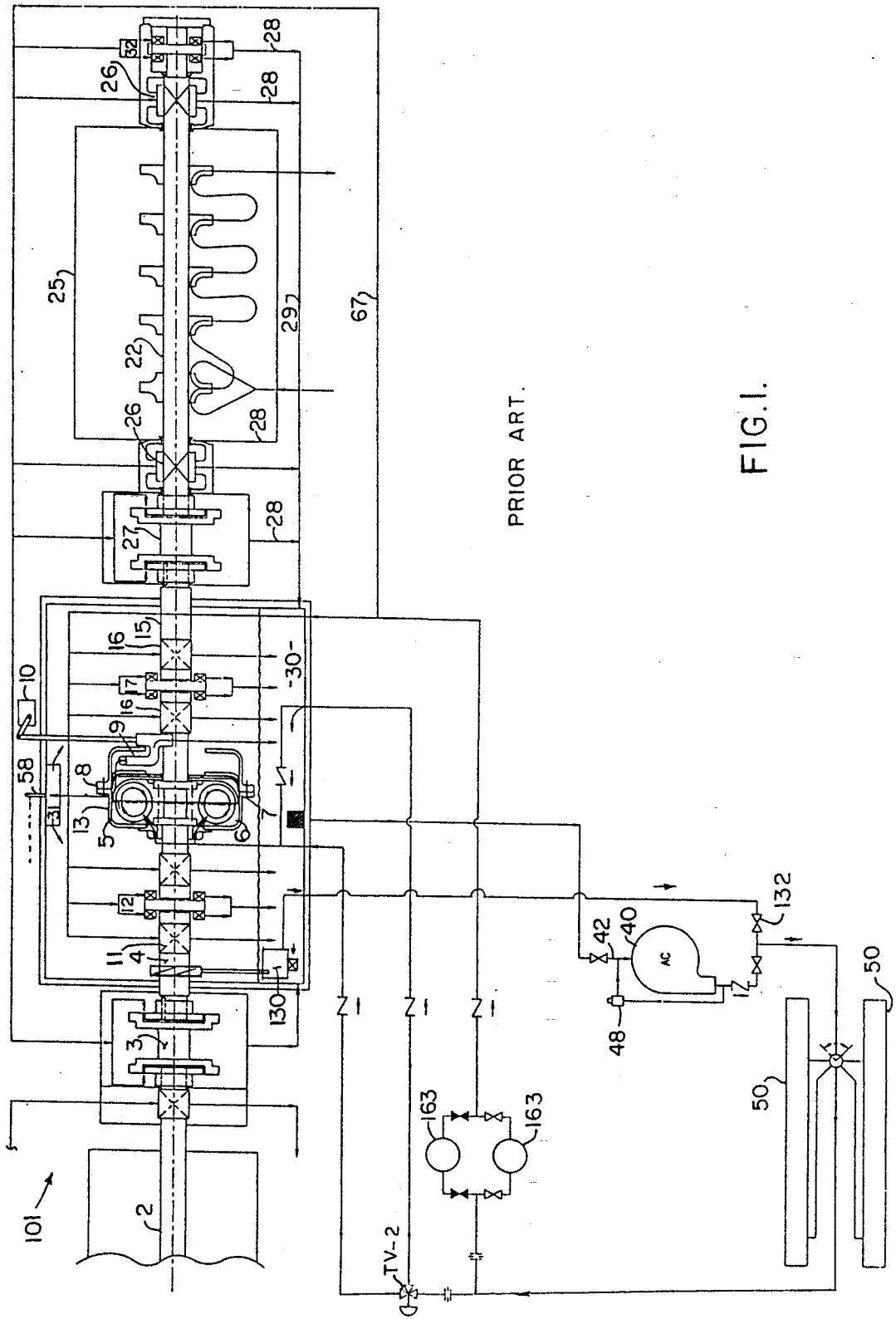
FIG. 1 is a diagrammatic view of a conventional system of Arrangement (1)
Figure 2:
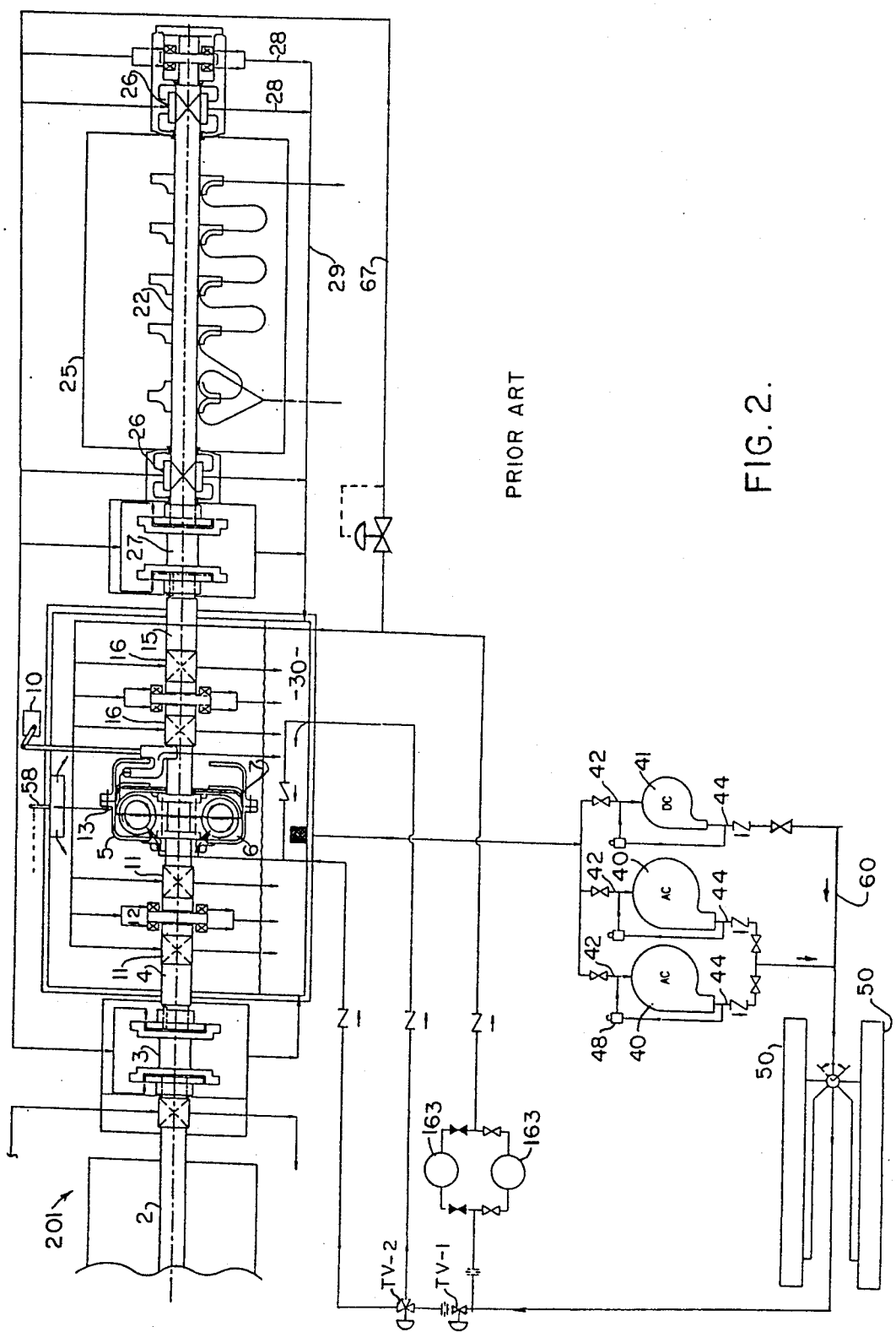
FIG. 2 is a diagrammatic view of a conventional systems of Arrangement (2)
Figure 2A:
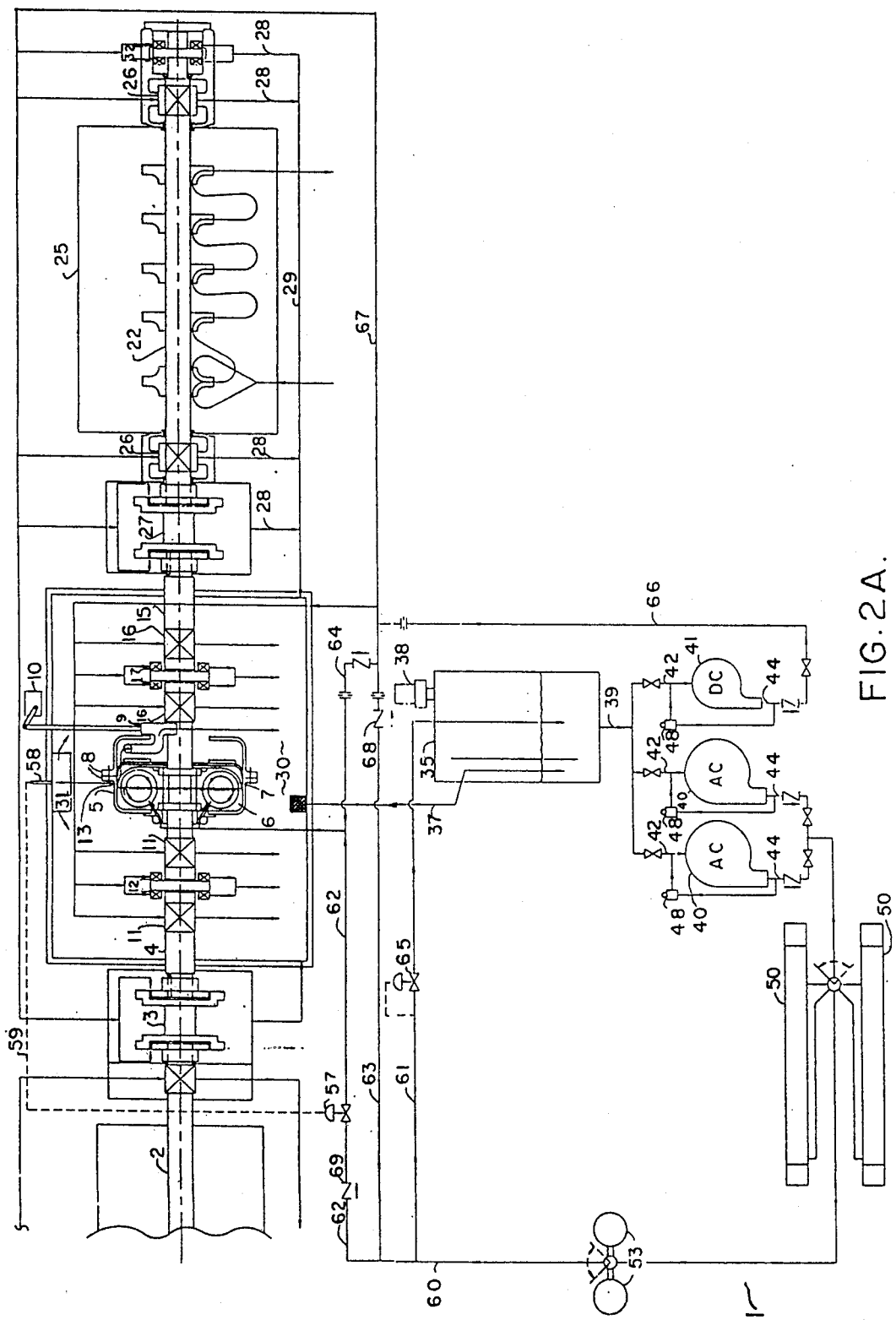
FIG. 2A is a diagrammatic view of one illustrative embodiment of a system of this invention, Arrangement (2A)
Figure 3:
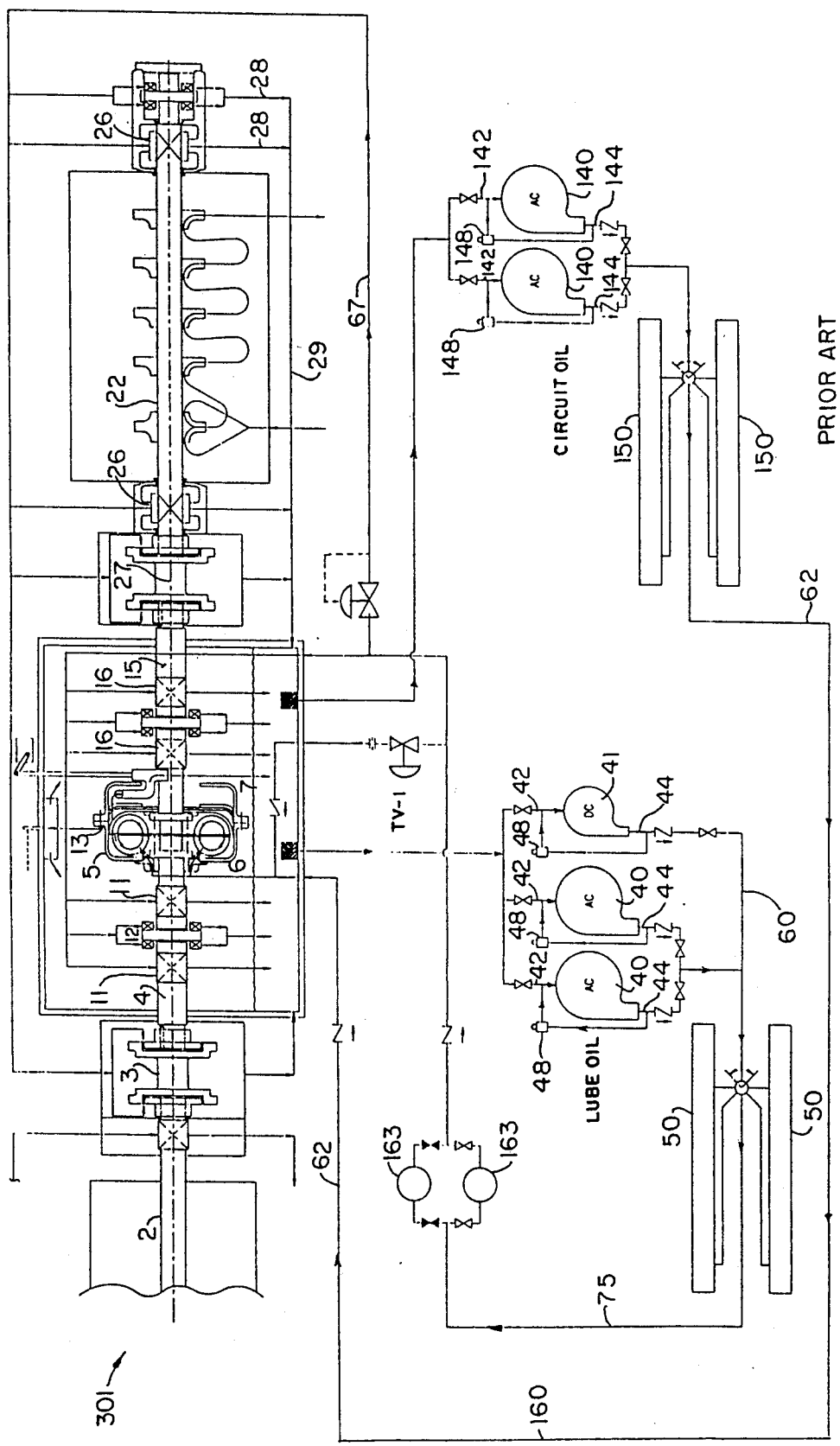
FIG. 3 is a diagrammatic view of a conventional system of Arrangement (3)
Figure 3A:
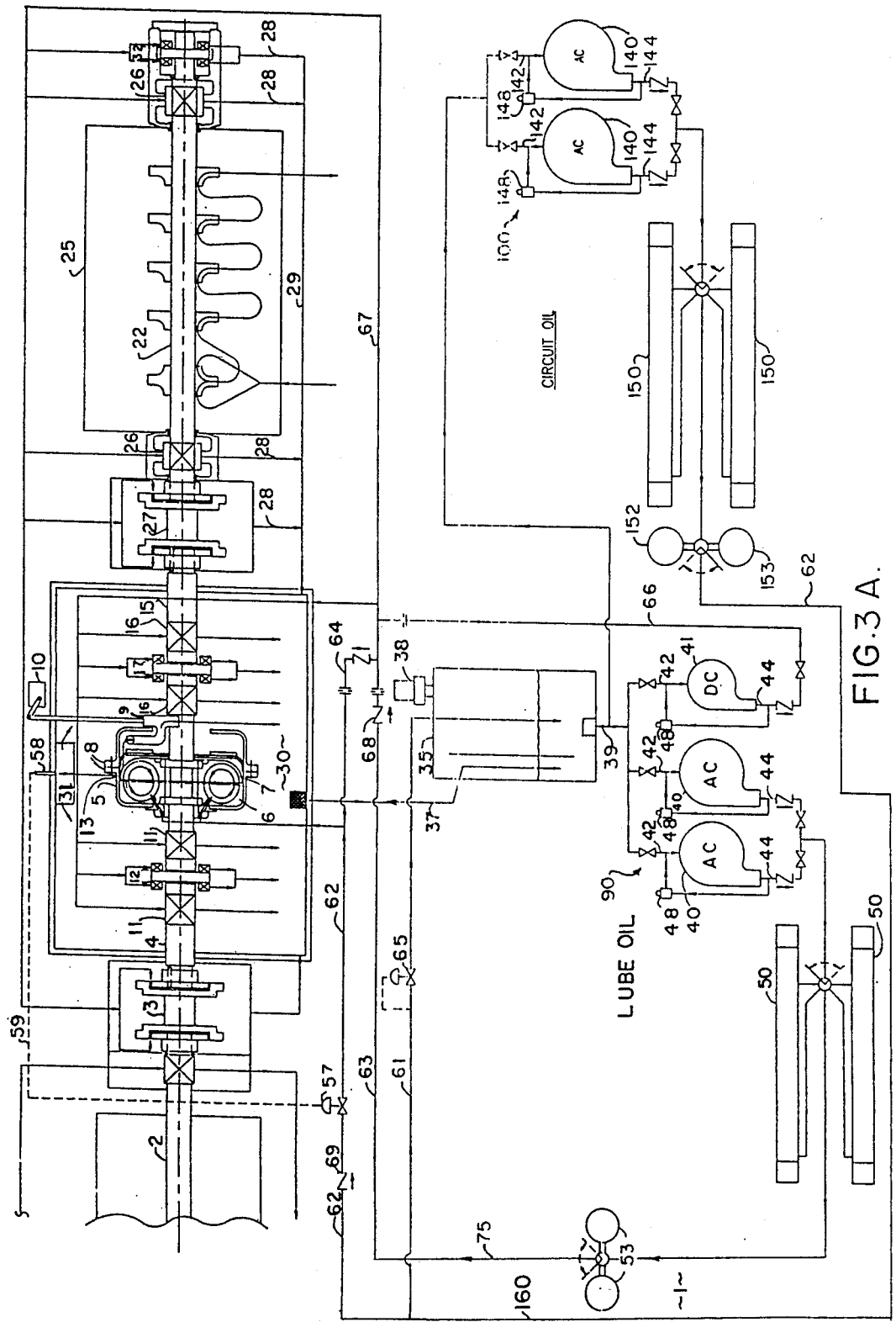
FIG. 3A is a diagrammatic view of another illustrative embodiment of this invention, Arrangement (3A).

There is no FIG. 1A, which would correspond to an illustrative embodiment of this invention as applied to Arrangement (1A), because FIGS. 2A and 3A amply illustrate the improvements of this invention.

DESCRIPTION OF THE PREFERRED EMBODIMENT

In the following description, the reference numerals of FIGS. 1, 2 and 3 that are common to the reference numerals of FIGS. 2A and 3A indicate elements common to the embodiments of this invention shown in FIGS. 2A and 3A and to the prior art.

Referring now to FIG. 2A, for a diagrammatic view of one embodiment of system of this invention, reference numeral 1 indicates the entire system. In this case, the system is applied to a fluid drive between a turbine-generator extension shaft 2 and a boiler feed water pump 25. The turbine shaft 2 is connected by means of a flexible coupling 3 to an input shaft 4 of the fluid drive 5. The input shaft 4 is supported by journal bearings 11 and thrust bearing 12, and is connected to an impeller 6, which is fixedly mounted on the input shaft 4. A runner 7 is fixed to an output shaft 15, journaled in journal bearings 16 and provided with a thrust bearing 17. The impeller 6 and runner 7 are enclosed in a casing 8, that is also fixedly connected to the shaft 4, so that the casing and impeller rotate at the same speed, the speed of the turbine shaft. A scoop tube 9 extends into the casing on the output side of the impeller, and is arranged to be moved selectively radially of the casing by means of a positioner 10.

The fluid drive 5 and the bearings that support its shafts are housed in a housing 14 which includes a built-in sump 30 into which oil from the fluid drive element and its bearings is discharged.

The output shaft 15 is connected to the shaft 22 of the boiler feed water pump 25 through a flexible coupling 27. The shaft 22 of the boiler feed water pump 25 is supported by journal bearings 26 and thrust bearing 32, from which oil is discharged, through lines 28 into a manifold 29 which carries it and oil from the coupling to the sump 30 of the fluid drive housing.

In the systems of the prior art, the sump 38 served as the reservoir for circuit and lube oil. In the preferred embodiment of this invention, oil discharged into the sump 30 drains into an external reservoir 35 through a drain line 37. The drain line 37 is preferably of rust-proof material, such as stainless steel and is of sufficiently large diameter, for example eight inches, to accommodate the discharged oil from the sump 30 without being filled to capacity. This leaves a head space in the drain line at all times, which permits detrainment of air as the oil flows to the external reservoir 35. The reservoir has a capacity substantially greater than the volume of circuit oil introduced, for example 2000 gallon capacity, 1000–1500 gallons of oil, to provide a substantial head space. The reservoir has a vent 38 which permits further detrainment of air from the discharged oil. A line 39 from the reservoir 35 leads to an intake side 42 of two A.C. pumps 40 which are normally operated singly and to the intake side of the sole emergency D.C. powered oil pump 41. Oil leaves the high pressure side 44 of each pump when that pump is in service. A bypass line is provided from the output line 44, through a relief valve 48, to the intake side 42 of the pump. As has been explained in the background of the invention, the relief valves 48 are frequently used by operators to control the flow rate of oil being pumped to the fluid drive in the conventional system. In the preferred embodiment of this invention, the relief valves 48 have high pressure set points, such that the bypass from the high pressure side of the pump to the low pressure side is only used in the unusual case of a downstream blockage.

In normal operation, oil leaving the high pressure side of either A.C. powered pump passes through the output line 44 to either cooler 50.

Down stream of the cooler 50, the oil passes through one of the filters of a duplex filter 53, thence to a header 60 which supplies oil to three items: (1) A line 61 to a pressure control valve 65 which controls the pressure of the oil in this header, returning oil to the reservoir 35 as needed to maintain the set point pressure of the header; (2) the fluid drive element through line 62, and (3) the bearings and couplings through lines 63 and 67. Only one turbine-generator/fluid drive/boiler feed water pump is shown in this embodiment, but multiple such trains may be supported from the same header, with all return lines going to the reservoir 35. If a gearbox were used, it would be lubricated from this line, or from a separate line from the header, with the oil return line to the sump 30.

Oil supply pipes, especially those downstream of the filter, are preferably to be made of rust-proof material, such as stainless steel, to minimize the particulate matter that can enter the fluid drive because it can not be filtered out of the oil. Practical considerations, such as the available materials of construction of valves and the need for electrically insulted pipe couplings to prevent galvanic action at locations where stainless steel and carbon steel meet, may limit the use of rust-proof material to the long runs of oil supply pipe.

For emergency bearing lube oil supply, a D.C. powered oil pump 41 is provided. As distinguished from the conventional arrangement shown in FIGS. 2 and 3, in the embodiments of this invention shown in FIGS. 2A and 3A, the oil from the discharge of pump 41 passes through line 66 bypassing the normal pumps, piping, coolers, filters, associated valves and control valve 57 and pressure regulating valve 65, entering line 67 which is directly connected to the various shaft bearings, couplings and circuit cooling oil line. Check valves 68 and 69 prevent this oil from entering the normal oil supply system. It is recognized that no forced cooling such as an oil to water cooler is used to dissipate heat, but very little heat is generated by the bearinqs, there is a large radiant heat surface area, and the entire unit shuts down when the D.C. pump starts to operate.

As can be seen by the diagram, the line 67 communicates with and supplies oil to several items: bearings 11, 12, 16 and 17 of the fluid drive, to the bearings 26 and 32 of the boiler feed water pump, the couplings 3 and 27 and to a line 64 called the "circuit cooling oil" line which connects to line 62. This line 64 supplies oil to the element to remove residual heat generated due to the windage when the input shaft is at normal operating speed (3600 rpm), the normal circuit oil supply through valve 57 is shut off and the fluid drive is in the standby mode.

A temperature controlled valve 57 is positioned in the supply line 62 from the header to the fluid drive element. The valve 57 is operatively connected to a temperature sensor 58. The temperature sensor 58 is located in a collection tray 31 in a position to sense the temperature of the oil as it is being discharged from the fluid drive element through weep holes 13. The sensor 58 provides a control, either an electric signal, pneumatic or a hydraulic actuation, to the valve 57 through a conductor or line 59. As can be seen from the drawing, the pressure regulating valve 65 serves as a means for maintaining the pressure on the inlet side of the temperature control valve 57 substantially constant.

At start up, valve 57 is closed, and pump 40 supplies oil to the oil system of line 63. Until valve 57 is opened, the oil system downstream of line 63 provides circuit cooling oil through line 65 to dissipate the heat caused by the windage of the impeller. When the boiler feed pump is to be engaged, valve 57 is opened, initially to about 30 percent, and after that, its opening is operatively determined by the temperature sensor 58.

As has been indicated, after the fluid drive is put into operation, the sensor 58 causes the valve 57 to open wider when the temperature of the oil in the circuit oil discharge collection tray 31 exceeds a predetermined level, and causes the valve 57 to be throttled down when the temperature drops, so as to maintain a substantially constant temperature of the oil discharged from the element. As has been explained heretofore, heating of the oil occurs in response to the inefficiency of the hydraulic power transfer between the impeller 6 and the runner 7.

Tables 2 and 3 illustrate the difference between the operation of the conventional constant oil flow, variable oil temperature system and the variable oil flow, constant oil temperature system of the present invention. In both tables, the numbers in the left-most column correspond to the numbers in that column of Table 1, and the conditions set out in the columns of Table 1. In Table 2, the constant flow of circuit oil is 530 gallons per minutes (GPM). In Table 3, as in Table 2, the inlet circuit oil temperature is 110° F. However, in Table 3, the rise in temperature is a substantially constant 67° F., the temperature of the oil at discharge being 177° F. 67° F. is used as an example. However, a higher or lower "Delta T" (temperature differential) can be used if conditions warrant or require it.

Usually the constant flow condition as described in Table 2 is associated with a 130° F. inlet oil temperature. However, the purpose for using the same circuit oil inlet temperature of 110° F. for Tables 2 and 3 and the maximum flow of 530 gpm in Table 3 equal to the constant flow used in Table 2 is to emphasize the effect of only one variable: the temperature control valve.

To reiterate, Table 2 is based upon a constant flow of 530 gpm, a constant inlet temperature of 110° F., and variable discharge temperature. Table 3 is based upon a variable flow up to 530 gpm, a constant inlet temperature of 110° F., and a constant discharge temperature of 167° F.

A further reduction of the inlet circuit oil temperature and/or an increase in the circuit oil discharge temperature so that the "delta T" increases will cause an inverse reduction in the circuit oil required and a commensurate reduction in the power loss at the scoop tube.

TABLE 2

|  | HP LOSS AT SCOOP TUBE | HP LOSS TOTAL | HP LOSS ROTATING ELEMENT AND SCOOP TUBE | TEMP. RISE IN CIRCUIT OIL, °F. | TEMP. OF CIRCUIT OIL AT DISCHARGE |
|---|---|---|---|---|---|
| 1. | 200 | 775 | 575 | 14 | 124 |
| 2. | 225 | 1,525 | 1,330 | 33 | 143 |
| 3. | 240 | 2,055 | 1,865 | 46 | 156 |
| 4. | 255 | 2,430 | 2,245 | 56 | 166 |
| 5. | 280 | 2,578 | 2,498 | 62 | 172 |
| 6. | 295 | 2,795 | 2,620 | 65 | 175 |
| 7. | 320 | 2,831 | 2,658 | 66 | 176 |
| 8. | 345 | 2,841 | 2,671 | 67 | 177 |
| 9. | 365 | 2,767 | 2,602 | 65 | 175 |
| 10. | 380 | 2,616 | 2,456 | 61 | 171 |
| 11. | 390 | 2,402 | 2,247 | 56 | 166 |
| 12. | 395 | 2,142 | 1,992 | 50 | 160 |
| 13. | 396 | 1,999 | 1,854 | 46 | 156 |
| 14. | 400 | 1,106 | 1,006 | 25 | 135 |

TABLE 3

|  | GALLONS CIRCUIT OIL PER MINUTE | ESTIMATED HP LOSS AT SCOOP TUBE | HP LOSS ROTATING ELEMENT & SCOOP TUBE | HP SAVED |
|---|---|---|---|---|
| 1. | 80 | 30 | 405 | 170 |
| 2. | 237 | 100 | 1,205 | 125 |
| 3. | 354 | 160 | 1,785 | 80 |
| 4. | 435 | 209 | 2,199 | 46 |
| 5. | 489 | 258 | 2,475 | 23 |
| 6. | 517 | 288 | 2,613 | 7 |
| 7. | 525 | 317 | 2,655 | 3 |
| 8. | 530 | 345 | 2,671 | 0 |
| 9. | 512 | 353 | 2,590 | 12 |
| 10. | 478 | 343 | 2,419 | 37 |
| 11. | 430 | 316 | 2,173 | 74 |
| 12. | 370 | 276 | 1,873 | 119 |
| 13. | 337 | 252 | 1,710 | 144 |
| 14. | 141 | 106 | 712 | 294 |

In the embodiment shown in FIG. 3A, as has been indicated heretofore, the oil system is divided into two separate systems, a circuit oil system 100 and a lubricating (lube) oil system 90. The lube oil system has the same pump components as the combined system of FIG. 2A, two AC pumps 40 and one DC pump 41, receiving oil from the reservoir 35 through a line 39. The pumps 40 deliver lube oil to coolers 50 and filter 53, hence directly, through a line 75, to the lube oil distributing lines 63 and 67. A line 64 connects with circuit oil line 62, to supply cooling oil to the fluid drive during start up or shut down period, or in an emergency situation, when the circuit oil system is shut down or disrupted. As in the embodiment of FIG. 2A, the emergency DC motor driven pump 41 is connected to by-pass the filters and coolers, supplying oil directly to the bearings and cooling oil to the fluid drive while the turbine-fluid drive-boiler feed water pump system is being brought down in response to an abnormal condition, for example, when there is no A.C. power, or a drastic drop in oil pressure. The circuit oil system employs two (or more) AC pumps 140, supplied with oil from the reservoir 35 by the same line 39 as the lube oil system. The circuit oil system has the same kind of by-pass system, with relief valves 148, as the lube oil system, and delivers circuit oil, through coolers 150 and filters 153, to the header 160.

In the system of the embodiment of FIG. 3A, because the lube oil passes through one set of coolers 50 and the circuit oil through another set of coolers 150, the amount of oil passing through either one of the sets of coolers is less than that passing through the coolers 50 of the embodiment shown in FIG. 2A, which means that the coolers can be made smaller, or else have the capacity to cool the oil more. The system of the embodiment of FIG. 3A is more versatile in some respects, but it also requires more equipment. In both embodiments, provision is made for maintaining flow of oil to the bearings, and cooling oil to the fluid drive to prevent overheating while the fluid drive is being shut down, by by-passing the usual coolers and filters, to minimize the likelihood of failure by virtue of a broken line or an open filter or the like in the rest of the system. In both embodiments, the turbine-fluid drive-boiler feed water pump system is shut down in response to a loss of AC power, to abnormal rise in circuit oil discharge temperature, or to loss of pressure in the oil system, particularly the lube oil system, in either case, energizing the DC pump to supply oil directly to the bearings and cooling oil to the fluid drive while the turbine-fluid drive-boiler feed water pump system is brought down.

Numerous variations in the construction of the device of this invention will occur to those skilled in the art in the light of the foregoing disclosure. Merely by way of example, a variable flow pump, responsive to signals from the temperature sensor 58, can be employed in lieu of the temperature controlled valve 57. A single valve can be used incorporating the functions of the temperature responsive valve 57 and the back pressure regulator 65, with orifices to aid in the control of the circuit oil flow. Although the fluid drive is described as being driven by a steam turbine shaft, it could be driven by a gas turbine or large electric motor. Similarly, the runner of the fluid drive can be connected to drive a fan or other device. These are merely illustrative.

Having thus described the invention, what is claimed and desired to be secured by Letters Patent is:

1. In a system for supplying oil to a fluid drive between an input shaft and an output shaft, wherein means are provided for driving said input shaft, said driving means driving said input shaft at a constant speed, said input shaft is connected to an impeller of the fluid drive, said output shaft is connected to a runner of said fluid drive, said impeller and runner comprising a fluid drive element, and the impeller and runner are fluidically coupled by oil between them, the speed of rotation of the output shaft being varied by the degree of coupling between the impeller and the runner, the degree of coupling being determined by the radial thickness of a vortex of oil between said impeller and said runner, bearings are provided in which said input and output shafts are journaled, pump means are provided for supplying circuit oil to said fluid drive element, and means are provided for removing oil from said fluid drive element, the improvement comprising temperature responsive means positioned adjacent said fluid drive element for sensing the temperature of circuit oil as it is discharged from said fluid drive element and for generating a signal in response to said sensed temperature, and control means, located in a line between said pump means and said fluid drive element, operatively connected to said temperature responsive means and responsive to said signal from said temperature responsive means, for controlling the flow of oil to said fluid drive element.

2. The improvement of claim 1 wherein the control means is a control valve.

3. In a system for supplying oil to a fluid drive between an input shaft and an output shaft, wherein means are provided for driving said input shaft, said driving means driving said input shaft at a constant speed, said input shaft is connected to an impeller of the fluid drive, said output shaft is connected to a runner of said fluid drive, said impeller and runner comprising a fluid drive element, and the impeller and runner are fluidically coupled by oil between them, the speed of rotation of the output shaft being varied by the degree of coupling between the impeller and the runner, the degree of coupling being determined by the radial thickness of a vortex of oil between said impeller and said runner, bearings are provided in which said input and output shafts are journaled, pump means are provided for supplying circuit oil to said fluid drive element, and means are provided for removing oil from said fluid drive element, the improvement comprising temperature responsive means positioned adjacent said fluid drive element for sensing the temperature of circuit oil as it is discharged from said fluid drive element and for generating a signal in response to said sensed temperature, and control means, located in a line between said pump means and said fluid drive element, operatively connected to said temperature responsive means and responsive to said signal from said temperature responsive means, for controlling the flow of oil to said fluid drive element, said control means being a control valve, a bypass line operatively connected with a line on an outlet side of said pump means, said bypass line communicating with a reservoir external to the fluid drive housing, and pressure responsive valve means located in said bypass line for maintaining a preset pressure at an inlet to said control valve of the oil to said fluid drive regardless of the oil flow through said control valve.

4. The improvement of claim 2 including oil cooling means and filter means, an outlet side of said pump being connected serially with said cooling means and said filter means, wherein all of the oil during normal operation passes through the cooling means and the filter means.

5. The improvement of claim 4 wherein a bypass line is connected to communicate with a header which is an oil supply line operatively connected to said outlet side of said pump, cooling and filter means, said bypass line communicating with a line extending between said filter means and said control valve and with a reservoir external of said fluid drive housing.

6. The improvement of claim 4 including a lubricating oil lien connected to communicate with an oil supply line between said filter means and said control valve, with a plurality of shaft bearings and with a cooling oil line supplying oil to said fluid drive element when said control valve is closed.

7. The improvement of claim 1 wherein said pump means consists solely of at least one electric motor driven pump.

8. In a system for supplying oil to a fluid drive between an input shaft and an output shaft, wherein means are provided for driving said input shaft, said driving means driving said input shaft at a constant speed, said input shaft is connected to an impeller of the fluid drive, said output shaft is connected to a runner of the fluid drive, said impeller and runner comprising a fluid drive element, and the impeller and runner are fluidically coupled by oil between them, the speed of rotation of the output shaft being varied by the degree of coupling between the impeller and the runner, the degree of coupling being determined by the radial thickness of a vortex of oil between said impeller and said runner, bearings are provided in which said input and output shafts are journaled, pump means are provided for supplying circuit oil to said fluid drive element, and means are provided for removing oil from said fluid drive element, the improvement comprising temperature responsive means positioned adjacent said fluid drive element for sensing the temperature of circuit oil as it is discharged from said fluid drive element and for generating a signal in response to said sensed temperature, and control means, operatively connected to said temperature responsive means and responsive to said signal from said temperature responsive means, for controlling the flow of oil to said fluid drive element, a fluid drive housing into which oil from said fluid drive and bearings is discharged and a return oil reservoir remote from said fluid drive housing, said housing acting as a dry sump being connected to said reservoir by a drain oil pipe of sufficient capacity to accommodate said drain oil without being filled whereby air entrained in said oil is at least partly detrained during its passage through said pipe, and said reservoir being of a capacity to provide surface are of oil in said reservoir sufficient for permitting substantially complete detrainment of said air during the dwell time of said oil therein, said reservoir being operatively connected to an intake side of said pump means.

9. The improvement of claim 8 wherein said drain oil pipe is made of rustproof material.

10. The improvement of claim 8 including oil cooling means and filter means, said outlet side of said pump being connected serially with said cooling means and said filter means.

11. The improvement of claim 10 including a lubricating oil line connected to communicate with an oil supply line between said filter means and said control valve, and communicating with a plurality of shaft bearings.

12. In a system for supplying oil to a fluid drive between an input shaft and an output shaft, wherein means are provided for driving said input shaft, said driving means driving said input shaft at a constant speed, said input shaft is connected to an impeller of the fluid drive, said output shaft is connected to a runner of the fluid drive, said impeller and runner comprising a fluid drive element, and the impeller and runner are fluidically coupled by oil between them, the speed of rotation of the output shaft being varied by the degree of coupling between the impeller and the runner, the degree of coupling being determined by the radial thickness of a vortex of oil between the said impeller and runner bearings are provided in which said input and output shafts are journaled, pump means are provided for supplying circuit oil to said fluid drive element, and means are provided for removing oil from between said impeller and said runner, the improvement comprising temperature responsive means positioned adjacent said fluid drive element for sensing the temperature of circuit oil as it is discharged from said fluid drive element and for generating a signal in response to said sensed temperature, and control means, located in a line between said pump means and said fluid drive element, operatively connected to said temperature responsive means and responsive to said signal from said temperature responsive means, for controlling the flow of circuit oil to said fluid drive element, an emergency lube oil supply system which bypasses the normal oil system, said emergency lube oil system comprising D.C. motor driven pump means having an input side operatively connected to a source of oil and an output side operatively connected to a bypass oil supply line operatively connected to said bearings and to said fluid drive element, said bypass oil supply line being operatively connected to an output side of said pump means and bypassing said control means, for lubricating said bearings and for supplying circuit cooling oil to said fluid drive element.

13. In a system for supplying oil to a fluid drive between an input shaft and an output shaft, wherein means are provided for driving said input shaft, said driving means driving said input shaft at a constant speed, said input shaft is connected to an impeller of the fluid drive, said output shaft is connected to a runner of said fluid drive, said impeller and runner comprising a fluid drive element, and the impeller and runner are fluidically coupled by oil between them, the speed of rotation of the output shaft being varied by the degree of coupling between the impeller and the runner, the degree of coupling being determined by the radial thickness of a vortex of oil between the said impeller and runner, bearings are provided in which said input and output shafts are journaled, said fluid drive having a fluid drive housing into which oil from said fluid drive and bearings is discharged, pump means are provided for supplying circuit oil to said fluid drive element, and means are provided for removing oil from said housing, the improvement comprising a return oil reservoir remote from said fluid drive housing, said housing acting as a dry sump connected to said reservoir by a drain oil pipe of sufficient capacity to accommodate said drain oil without being filled, whereby air entrained in said oil is at least partly detrained during its passage through said pipe, and said reservoir being of a capacity to provide a surface area of oil in said reservoir sufficient to permit substantially complete detrainment of said air during the dwell time of said oil in said reservoir, said reservoir being operatively connected to an intake side of said pump means.

14. In a system for supplying oil to a fluid drive between an input shaft and an output shaft, wherein means are provided for driving said input shaft, said driving means driving said input shaft at a constant speed, said input shaft is connected to an impeller of the fluid drive, said output shaft is connected to a runner of said fluid drive, said impeller and runner comprising a fluid drive element, and the impeller and runner are fluidically coupled by oil between them, the speed of rotation of the output shaft being varied by the degree of coupling between the impeller and the runner, the degree of coupling being determined by the radial thickness of a vortex of oil between said impeller and said runner, bearings are provided in which said input and output shafts are journaled, pump means are provided for supplying circuit oil to said fluid drive element, and means are provided for removing oil from said fluid drive element, the improvement comprising temperature responsive means positioned adjacent said fluid drive element for sensing the temperature of circuit oil as it is discharged from said fluid drive element and for generating a signal in response to said sensed temperature, and control means, operatively connected to said temperature responsive means and responsive to said signal from said temperature responsive means, for controlling the flow of oil to said fluid drive element, said control means being at least one variable speed pump.

15. In a system for supplying oil to a fluid drive between an input shaft and an output shaft, wherein means are provided for driving said input shaft, said driving means driving said input shaft at a constant speed, said input shaft is connected to an impeller of the fluid drive, said output shaft is connected to a runner of said fluid drive, said impeller and runner comprising a fluid drive element, and the impeller and runner are fluidically coupled by oil between them, the speed of rotation of the output shaft being varied by the degree of coupling between the impeller and the runner, the degree of coupling being determined by the radial thickness of a vortex of oil between said impeller and said runner, bearings are provided in which said input and output shafts are journaled, pump means are provided for supplying circuit oil to said fluid drive element, and means are provided for removing oil from said fluid drive element, the improvement comprising temperature responsive means positioned adjacent said fluid drive element for sensing the temperature of circuit oil as it is discharged from said fluid drive element and for generating a signal in response to said sensed temperature, and control means, operatively connected to said temperature responsive means and responsive to said signal from said temperature responsive means, for controlling the flow of oil to said fluid drive element, said control means comprising means for starting and stopping a series of constant speed pumps.

16. The improvement of claim 14 wherein said control means is a combination of one or more constant speed pumps and one or more variable speed pumps.

17. In a system for supplying oil to a fluid drive between an input shaft and an output shaft, wherein means are provided for driving said input shaft, said driving means normally driving said input shaft at a constant speed, said input shaft is connected to an impeller of the fluid drive, said output shaft is connected to a runner of the fluid drive, said impeller and runner comprising a fluid drive element, and the impeller and runner are fluidically coupled by oil between them, the speed of rotation of the output shaft being varied by the degree of coupling between the impeller and the runner, the degree of coupling being determined by the radical thickness of a vortex of oil between them, said fluid drive input and output shafts having bearings through which oil is circulated, said fluid drive having a fluid drive housing into which oil from said fluid drive element and bearings is discharged, the improvement comprising AC motor driven pump means for supplying oil to said fluid drive element and to said bearings through cooler means and filter means, and emergency DC motor driven pump means operatively connected to a source of oil and to a bypass line bypassing said filter and cooler means for supplying lubricating oil directly to said bearings and cooling oil to said fluid drive element while the rotation of said input shaft is being brought down in response to an abnormal condition.

18. In a system for supplying oil to a fluid drive between an input shaft and an output shaft, wherein means are provided for driving said input shaft, said driving means normally driving said input shaft at a constant speed, said input shaft is connected to an impeller of the fluid drive, said output shaft is connected to a runner of said fluid drive, said impeller and runner comprising a fluid drive element, and the impeller and runner are fluidically coupled by oil between them, the speed of rotation of the output shaft being varied by the degree of coupling between the impeller and the runner, the degree of coupling being determined by the radical thickness of a vortex of oil between them, said fluid drive input and output shafts having bearings through which oil is circulated, said fluid drive having a fluid drive housing into which oil from said fluid drive element and from said bearings is discharged, and lines of oil supply and return piping external of said housing the improvement comprising oil cooling means and filter means, operatively connected to a pressure side of said pump means, and oil supply lines and valves, operatively connected to said cooling means and filter means downstream of the cooling means and the filter means, and to the fluid drive element and bearings associated with the fluid drive, and to one or more of a gear box, couplings, and boiler feed pump, at least some of said lines of oil supply and return piping and valves being made of rust-proof materials.

19. In a system for supplying oil to a fluid drive between an input shaft and an output shaft, wherein means are provided for driving said input shaft, said driving means normally driving said input shaft at a constant speed, said input shaft is connected to an impeller of the fluid drive, said output shaft is connected to a runner of the fluid drive, said impeller and runner comprising a fluid drive element, and the impeller and runner are fluidically coupled by oil between them, the speed of rotation of the output shaft being varied by the degree of coupling between the impeller and the runner, the degree of coupling being determined by the radial thickness of a vortex of oil between them, said fluid drive input and output shafts having bearings through which oil is circulated, said fluid drive having a fluid drive housing into which oil from said fluid drive element and from said bearings is discharged, and pump means operatively connected to pump said discharged oil to said fluid drive element and to said bearings and to one or more of a gear box, couplings, and boiler feed pump bearings, and a piping and valve system connected mediately or immediately to a pressure side of said pump means and to said fluid drive element and to said fluid drive bearings and to one or more of a gear box, couplings, and boiler feed pump bearings, and lines of oil supply and return piping external of said housing the improvement comprising electrically insulated couplings in said external piping and valve system, at least some of said piping and valves being made of rust-proof materials, said insulating couplings being sandwiched between non-rust-proof parts and rust-proof parts of said pumps, piping and valves.

* * * * *